(12) United States Patent
Subrahmanyan et al.

(10) Patent No.: US 6,831,925 B1
(45) Date of Patent: Dec. 14, 2004

(54) SINGLE WIRE INTERFACE WITH COLLISION DETECTION

(75) Inventors: Ravi Subrahmanyan, Windham, NH (US); Mark L. Seiders, Mountain View, CA (US); Peter R. Holloway, Andover, MA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/286,927

(22) Filed: Apr. 6, 1999

(51) Int. Cl.[7] .............................................. H04L 12/413
(52) U.S. Cl. ........................................ 370/447; 370/445
(58) Field of Search ................................. 370/445, 447, 370/449, 450, 451, 461, 462, 463

(56) References Cited

U.S. PATENT DOCUMENTS

| | | | |
|---|---|---|---|
| 4,063,220 A | * 12/1977 | Metcalfe et al. | ............. 340/147 |
| 4,412,347 A | 10/1983 | Lipcon | .......................... 455/58 |
| 4,439,856 A | * 3/1984 | Ulug | ............................ 370/85 |
| 4,638,311 A | * 1/1987 | Gerety | ........................ 370/447 |
| 4,644,348 A | * 2/1987 | Gerety | ........................ 370/447 |
| 4,779,088 A | * 10/1988 | Restrepo | .................. 340/825.5 |
| 5,043,722 A | 8/1991 | Aggers et al. | ........... 340/825.5 |
| 5,162,791 A | 11/1992 | Heegard | ................... 340/825.5 |
| 5,335,226 A | 8/1994 | Williams | .................... 370/85.2 |
| 5,434,861 A | * 7/1995 | Pritty et al. | ................ 370/85.8 |
| 6,172,984 B1 | * 1/2001 | Beyda et al. | ................ 370/448 |
| 6,385,210 B1 | * 5/2002 | Overberg et al. | ........... 370/447 |
| 6,405,272 B1 | * 6/2002 | Regis | .......................... 710/121 |

FOREIGN PATENT DOCUMENTS

JP 401265634 A * 10/1989 .................. 370/445

* cited by examiner

Primary Examiner—Steven Nguyen
Assistant Examiner—Thien Tran
(74) Attorney, Agent, or Firm—Patent Law Group LLP; Carmen C. Cook

(57) ABSTRACT

A structure and process are provided for using a single wire or data bus to detect collisions between two communication nodes connected by the single wire by sensing current changes in the wire, where large current changes indicate a collision. When a second node wants to obtain control of the wire on which a first node is transmitting data, the second node transmits a special data packet to ensure a collision and cause a large current to flow on the wire. Once a large current is detected in the wire to indicate a bit difference or collision, the first node stops transmitting and waits until it receives a synchronization bit pattern, which will indicate that the special data packet transmitted by the second node has ended. The two nodes are now synchronized, such that the second node has control of the wire and can begin transmission of a data packet. In order to indicate a collision, the large current flow must remain high after a specified time interval, such as a clock cycle. In the case of a capacitive load, such as a bus, the time interval is the time needed for the bus to settle.

19 Claims, 4 Drawing Sheets

SINGLE WIRE INTERFACE WITH COLLISION DETECTION

BACKGROUND

1. Field of Invention

The present invention relates to data communication systems and more particularly to collision detection in such systems.

2. Related Art

Certain data communication systems have nodes or devices which exchange information with each other via an asynchronous data bus or wire connecting the nodes. A node can be an electronic circuit that has the ability to generate and encode information and place that information on the data bus, and to also receive and decode information placed on the data bus by another node. Nodes may be classified as either master or slave nodes, and master nodes can be either active or inactive. Active master nodes can transmit a message absent a request from another node for the message, while inactive master nodes and slave nodes have no capability for communicating with each other and can only transmit information on the data bus upon receiving a request from an active master node.

In typical packet switching systems, numerous nodes are connected to the same communication network and can access the network at the same time. As a result, if two active master nodes are transmitting information onto the data bus at the same time, packet collisions can occur. When a collision of packets is detected, an instruction is sent to retransmit the original data so that another attempt may be made to receive the packet without a collision. If a collision of packets is not detected, the information transmitted is lost since the signal received is unintelligible, as it is the sum of overlapping packets.

Numerous techniques are known in the art for preventing or detecting data or packet collisions. In some systems, data transmission from a device or node A to a device or node B is effected through two separate wires, one wire for transmission of data from A to B and one wire for transmission from B to A. By using two separate unidirectional wires for data transmission, data packet collision is prevented. A global clock can be used to start and stop data transmissions. Utilizing such a technique, however, can increase the complexity and size of the system as the number of nodes in the system increases. As a result, the number of transmission wires needed so that each node can communicate with every other node can quickly increase to an impractical number.

Other systems may use a single bidirectional wire for data transmission from both A to B and from B to A. In order to prevent collisions, a separate control wire is used to control which device is to write to the bus. The control wire is also used to synchronize the master and the slave. Again, as the number of nodes increases, the number of wires and complexity to the communication system can become impractical.

Still other communication systems may use collision detection methods to determine whether a collision has occurred. For example, a collision is detected when a detection threshold has been exceeded on the data bus, which typically requires setting a precise detection threshold. When a collision is detected, all nodes cease transmission onto the data bus. Ordinarily these techniques are implemented at each node that is transmitting a data packet. Known collision detection methods for bus topology networks compare the data being transmitted with data being simultaneously received at the transmitting node and report collisions when a mismatch is detected. These types of systems may also require multiple node connections, which can quickly become very large as the number of nodes increases.

Accordingly, a communication system with collision detection is desired which overcomes the deficiencies discussed above with conventional collision detection systems.

SUMMARY

The present invention provides a structure and method for detecting data packet collisions between two devices by sensing current changes on a single wire interface between two or more devices and then synchronizing the devices after a collision detection. Without a need for a separate control wire, large multi-node systems can be more easily configured. Furthermore, by sensing current changes, precise detection thresholds do not need to be set.

According to the present invention, two nodes A and B transmit data on a single bidirectional line. Assume node A is writing to a data bus, and node B is not transmitting, i.e., listening. If node B wishes to obtain control of the data bus, node B transmits a special data packet to ensure that a collision occurs, i.e., that the data packet being written by node A has at least one bit different in the data stream than the data packet transmitted by node B. When this difference is encountered, an increased amount of current will flow in the single wire because one node will be trying to pull the wire high while another node will be trying to pull the wire low. This current increase is sensed in node A, causing node A to immediately halt data transmission and revert to a listening mode, i.e., reading the output of node B. When node A reads a specific output from node B indicating that node B has ended transmission of the special data packet, nodes A and B are synchronized. Thus, the special data packet contains a bit pattern to ensure a collision detection followed by a bit pattern to indicate the end of the special packet transmission, thereby synchronizing the two nodes. As a result, collision detection and node synchronization can be achieved with a single wire interface, without the need for separate control wires or precise detection thresholds.

According to one embodiment of the present invention, the data packet transmitted by node A consists of at least three consecutive bits of the same type. When the other node B wishes to assert control of the data bus, node B transmits a special data packet having alternating 1's and 0's and ending with two consecutive 1's. Because the bit stream transmitted by node A has at least three consecutive same-type bits, there will be at least one position in the bit stream where the bits transmitted by node A differ from the bits transmitted by node B, thereby ensuring a collision. The presence of a collision on the wire results in a large current on the wire, while no collision results in little or no current on the wire (after a short discharging period). If node A still senses excess current on the wire after a specified time period, a collision is detected. The excess current, which is typically large, can be defined as an amount of current in excess of the amount of current on the wire when no collision is present. Therefore, as long as a large current is sensed, a collision can be detected. Consequently, no precise detection thresholds have to be set to detect collisions on the wire. If a collision is detected, node A stops transmitting data and reads the remaining bits transmitted onto the wire by node B. Once node A encounters two consecutive '1's, node A knows that node B has stopped transmission of the special packet and that the next data packet will consist of information intended for node A, thereby synchronizing the two nodes.

The present invention will be more fully understood in light of the following detailed description taken together with the accompanying drawings.

BRIEF DESCRIPTION OF DRAWINGS

Note that use of the same reference numbers in different figures indicates the same or like elements.

DETAILED DESCRIPTION

According to the present invention, a structure and method are provided for using a single wire or data bus to detect collisions between two communication nodes connected by the single wire by sensing current changes on the wire. A collision, i.e., when one node tries to write a logic '0' to the wire and another node tries to simultaneously write a logic '1' to the wire, is detected when a current change is sensed on the wire. To ensure a collision, a first node, which has control of the wire, transmits a data packet containing a bit pattern of at least three consecutive bits of the same type. When a second node wants to obtain control of the wire or data bus, the second node transmits a special data packet containing a sequence of alternating logic 1's and 0's and ending with two consecutive logic 1's. As a result, there will be at least one instance in the two transmitted packets where the bits differ, which ensures a collision and causes a large current to flow in the wire. Once a sufficient current change is detected in the wire to indicate a bit difference or collision (discussed in detail below), the first node stops transmitting and waits until it receives two consecutive logic 1's, which will indicate that the special data packet transmitted by the second node has ended. The two nodes are now synchronized, such that the second node has control of the wire and can begin transmission of a data packet. After detecting the two consecutive 1's, the first node knows that the next data stream from the second node is intended data for the first node.

Figure 1:
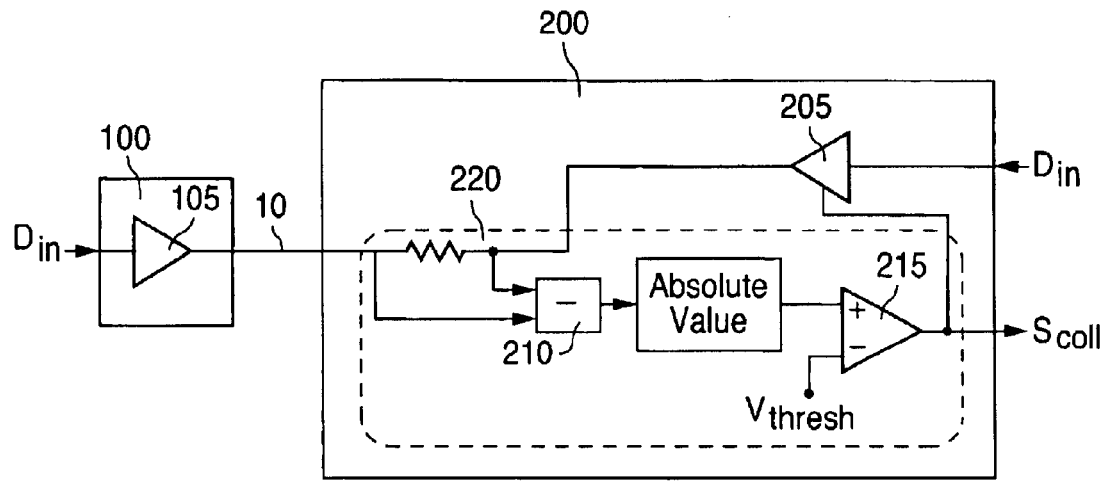
FIG. 1 is a general diagram of a single-wire communication system with collision detection according to one embodiment of the present invention.

FIG. 1 shows one general embodiment of the present invention. A node or device 100, which can be a controller, is connected to a node or device 200, e.g., an analog-to-digital converter, by a single wire or data bus 10. Both devices 100 and 200 transmit packets of the same width or size onto wire 10 via drivers 105 and 205, respectively. Assume device 200 has control of the data bus and is transmitting information in fixed-width packets onto wire 10 while device 100 is listening. When device 100 wants to obtain control of the data bus, device 100 transmits a special data packet onto wire 10 to ensure a collision on the wire. One way to ensure a collision is for the device which has control of the bus (device 200) to transmit at least three consecutive bits of the same type within the information or message bits in the data packet. For example, for a message field containing 12 data bits and one sign bit, a 16-bit data packet can be utilized using a 3-bit sign extension, where three copies of the sign bit are inserted into the 16-bit packet. Other size and type packets can be used in which at least three consecutive same-type bits are inserted at the end of the packet or elsewhere in the packet.

To ensure a collision, the device attempting to obtain control of the bus (device 100) sends a special data packet with a bit stream containing alternating 1's and 0's and ending with two consecutive 1's. Accordingly, there will be at least one position in the two packets transmitted by devices 100 and 200 where the bits will differ. Table 1 below shows some examples of bit streams transmitted by the two devices and the bit position where a bit-difference is encountered. The least significant bit (lsb) at the far left of the bit stream is designated bit position 0 and the most significant bit (msb) at the far right of the bit stream is designated bit position 15.

TABLE 1

|  | bit stream<br>lsb . . . msb | first different bit<br>position |
|---|---|---|
| Device 200 | 1010110100001011 | 5 |
| device 100 | 1010101010101011 |  |
| Device 200 | 1011110010100101 | 3 |
| device 100 | 1010101010101011 |  |
| Device 200 | 1010101111011001 | 7 |
| device 100 | 1010101010101011 |  |
| Device 200 | 1010101010101111 | 13 |
| device 100 | 1010101010101011 |  |

Note that the last example is the worst case situation, where the twelve message bits and one sign bit are identical to the first thirteen bits transmitted by device 100.

Upon encountering a bit-difference, a collision detection circuit 220 in device 200 senses a current increase on wire 10, indicating a collision. Collision detection circuit 220 includes a resistor R on wire 10 coupling the two drivers 105 and 205. The resistor is connected between inputs to a difference circuit 210, which measures a voltage difference, and therefore a current flowing, across resistor R. When drivers 105 and 205 are transmitting the same data (i.e., logic '0' or logic '1') onto wire 10, the voltage difference across resistor R is very small and little or no current flows across resistor R. However, when drivers 105 and 205 simultaneously transmit different data onto wire 10 (i.e., both a logic '1' and a logic '0' are being transmitted onto wire 10), a large voltage difference exists across resistor R, producing a large current flow. Consequently, when a comparator 215, such as an operational amplifier (op amp), senses a large current change on the wire or large voltage change across resistor R, a collision is detected. Thus, comparator 215 senses voltage changes on the wire, and when the voltage difference exceeds a threshold $V_{thresh}$, a collision is detected. It should be noted that the threshold value can be set at any current or voltage in excess of the value when no collision is present on the wire, even if it is below the value when a collision is present on the wire. In other words, the threshold for comparison does not need to be precisely set, but can be within a wide range of values, as long as the threshold represents a large enough change in current or voltage to indicate a collision. As a result, the complexity of the collision detection circuit is reduced.

When a collision is detected, comparator 215 sends a signal to disable driver 205, which halts data transmission by device 200. Device 200 then listens and reads the data from the special packet being written onto wire 10 from device 100. When device 200 detects two consecutive 1's to denote the end of the special data packet, the two devices are synchronized. Device 200 is thus aware that the next data transmission from device 100 onto wire 10 is an intended message from device 100. Accordingly, a single wire can be used to detect collisions and synchronize communications between two or more nodes or devices on a data bus, which does not require precise collision detection thresholds to be determined and set. Device 100 preferably includes collision detection circuitry similar to that of device 200 such that once device 100 takes control of the data bus, device 100 can detect a collision and cease data transmissions if device 200 wishes to re-assert control of the bus.

Figure 2:
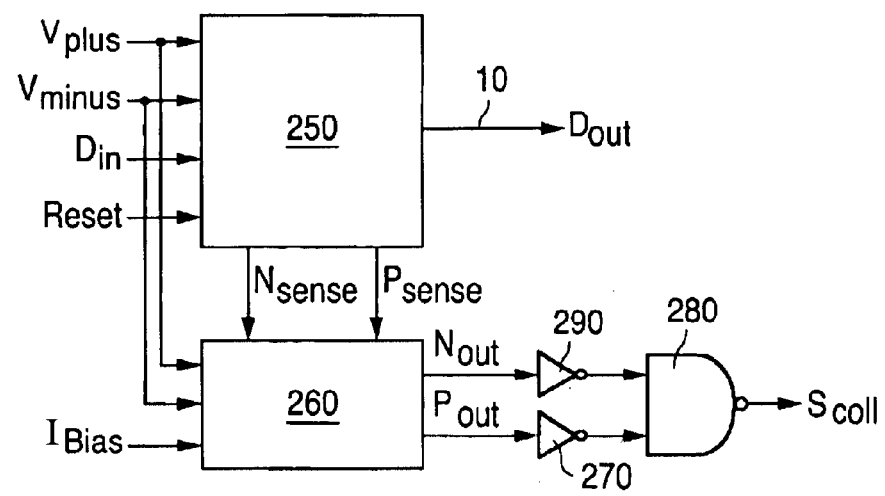
FIG. 2 is a diagram of a node or device of the system of FIG. 1 according to one embodiment.

FIG. 2 shows one implementation of device 200 of FIG. 1 for sensing excess current on wire 10. Device 200 includes an inverting driver circuit 250, a collision detection circuit 260, and various logic gates. Both driver circuit 250 and detection circuit 260 are connected to a positive voltage supply $V_{plus}$ and a negative voltage supply or ground $V_{minus}$. A signal Reset controls whether driver circuit 250 is active or inactive. $D_{in}$, which is input to driver circuit 250, represents the data to be written onto wire 10 by device 200, and $D_{out}$ represents the data present on wire 10. It should be pointed out that wire 10 can also receive signals from device 100, as shown in FIG. 1. Based on the values of $D_{in}$ and $D_{out}$, driver circuit 250 outputs voltages $P_{sense}$ and $N_{sense}$ to collision detection circuit 260. $P_{sense}$ represents the situation where device 200 is writing a logic '1' onto wire 10, i.e., where $D_{in}=0$ (since driver circuit 250 is an inverting driver), and $N_{sense}$ represents the situation where device 200 is writing a logic '0' onto wire 10, i.e., where $D_{in}=1$.

Collision detection circuit 260 detects excess current flowing on wire 10 using the values of $P_{sense}$ and $N_{sense}$ from driver circuit 250. If a collision has occurred when device 200 is writing a '1' onto wire 10 (device 100 is simultaneously writing a '0' onto wire 10), then an output $P_{out}$ of detection circuit 260 will be low. After passing through a buffer 270 (optional) and a NAND gate 280, $P_{out}$ causes a signal $S_{coll}$ to go high. On the other hand, if a collision has occurred when device 200 is writing a '0' onto wire 10 (device 100 is simultaneously writing a '1' onto wire 10), then an output $N_{out}$ of detection circuit 260 will be high, resulting in $S_{coll}$ being high after $N_{out}$ is passed through an inverter 290 and the NAND gate 280. However, when no collision is detected, $P_{out}$ is high and $N_{out}$ is low, which results in $S_{coll}$ being low. The signal $S_{coll}$ can be coupled to the Reset input of driver circuit 250 (not shown) so that the signal $S_{coll}$ disables driver circuit 250 when a collision is detected or keeps driver circuit 250 active when no collision is detected, thereby either halting or maintaining transmissions onto wire 10, respectively.

Figure 3:
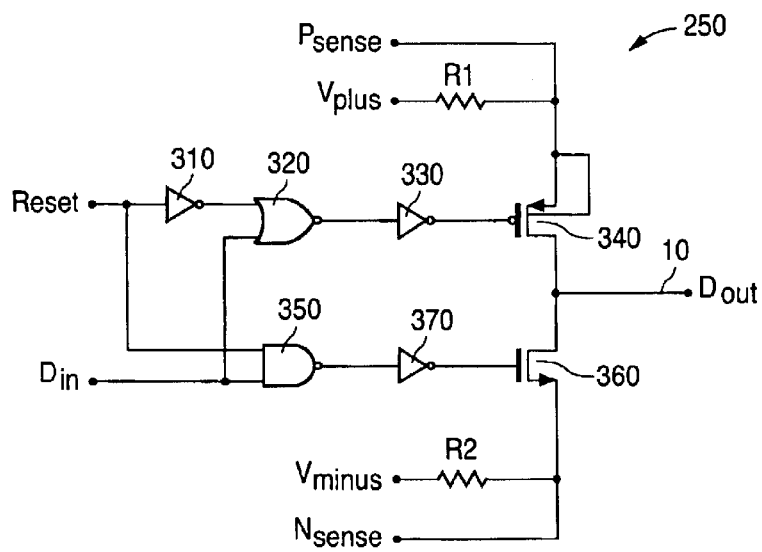
FIG. 3 is circuit diagram of the driver of FIG. 2 according to one embodiment.
Figure 6:
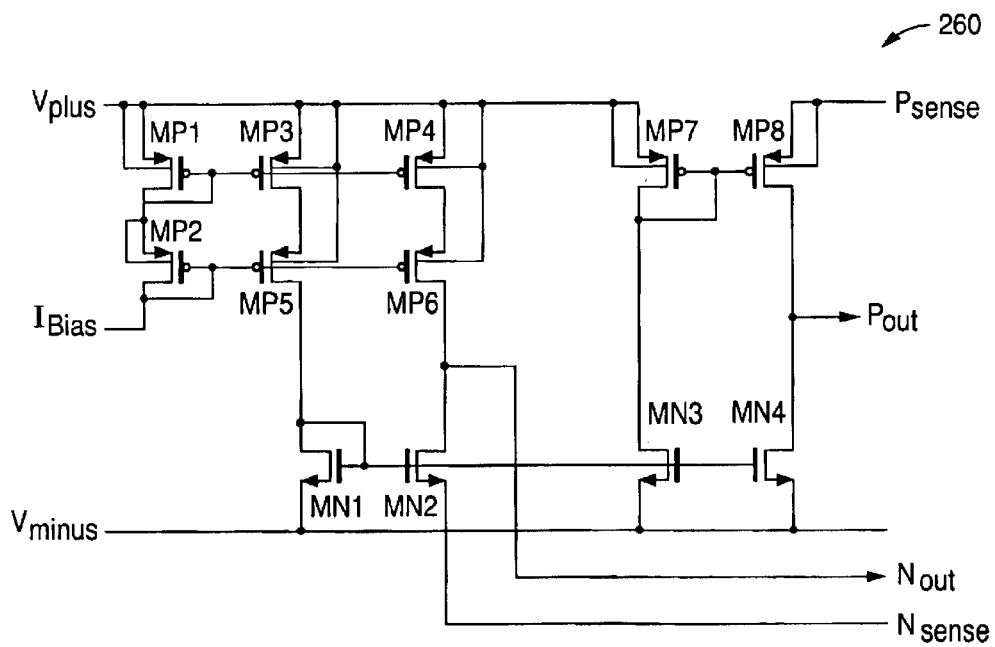
FIG. 6 is a circuit diagram of the collision detection circuit of FIG. 2 according to one embodiment.

FIGS. 3 and 6 show circuit diagrams of an implementation of driver circuit 250 and collision detection circuit 260, respectively, of FIG. 2. FIG. 3 shows an inverting driver, in which Reset=1 to activate driver circuit 250 and Reset=0 to disable driver circuit 250, and in which $D_{in}=0$ to write a logic '1' on wire 10 and $D_{in}=1$ to write a logic '0'. Non-inverting drivers can also be used with this invention. Driver circuit 250 is composed of basically two separate branches, an upper branch for the case where a logic '1' is being written and a lower branch for the case where a logic '0' is being written. The upper branch includes an inverter 310 coupling the signal Reset to one input of a NOR gate 320, with the other input being $D_{in}$, and an inverter 330 coupling the output of NOR gate 320 to the gate of a PMOS transistor 340. A sense resistor R1 couples the positive supply voltage $V_{plus}$ to the source of PMOS transistor 340. The lower branch includes a NAND gate 350 having inputs coupled to signals Reset and $D_{in}$ and the output coupled to an NMOS transistor 360 by an inverter 370. A sense resistor R2 couples the ground or negative voltage supply $V_{minus}$ to the source of NMOS transistor 360.

When Reset=0, the output of inverter 330 is high and the output of inverter 370 is low, thereby turning off PMOS transistor 340 and NMOS transistor 360, respectively, and disabling driver circuit 250. When Reset=1, the operation of the upper and lower branches depends on the value of $D_{in}$. For example, when device 200 wants to write a logic '1' onto wire 10, $D_{in}$ is set to '0' and Reset is set to '1'. With $D_{in}=0$, the output of both inverters 330 and 370 are low, which turns on PMOS transistor 340 and turns off NMOS transistor 370, respectively. With PMOS transistor 340 on, current drawn from $V_{plus}$ flows across sense resistor R1 and through PMOS transistor 340 to charge wire 10.

Figure 4A:
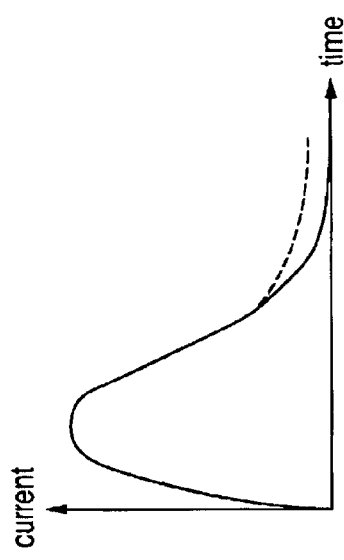
FIGS. 4A and 4B are graphs of current and voltage curves without a data collision.
Figure 4B:
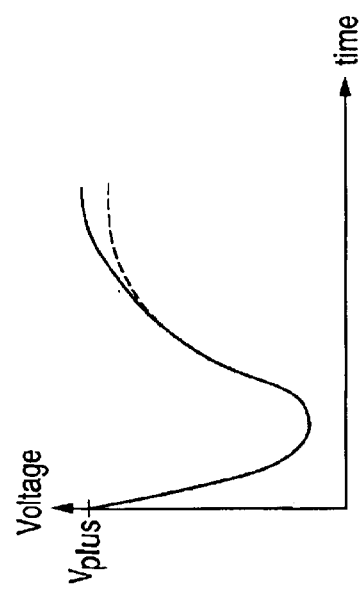

When PMOS transistor 340 is on and NMOS transistor 360 is off, there is no collision when output driver 250 is attempting to write a '1' while the other device is also attempting to write a '1'. In this case, shown in FIG. 4A, the current flowing in PMOS transistor 340 starts at zero before PMOS transistor 340 is turned on, increases to some maximum value as wire 10 is charged, and then falls back to zero (or some small constant value, shown as the dotted line in FIG. 4A, if there is a pull down resistor on the wire) after wire 10 is charged to a logic '1' level. The voltage at $P_{sense}$, which is measured between sense resistor R1 and the source of PMOS transistor 340 is initially at $V_{plus}$ prior to PROS transistor 340 turning on. After PMOS transistor 340 turns on and the current through sense resistor R1 rises, the voltage at $P_{sense}$ begins to drop, as shown in FIG. 4B, and when the current begins to fall back down to zero (or some small value when a pull down resistor is on wire 10), the voltage at $P_{sense}$ increases back up to $V_{plus}$ (or some other value around $P_{sense}$, shown as the dotted line in FIG. 4B, if a pull down resistor is present). Therefore, with no collision, the current flowing in PMOS transistor 340 is zero or some other small value after a period of time for the high current due to the capacitive charging of wire 10 to subside. At this time, the current can be measured. For example, if data is sent on the rising (or falling) edge of a clock cycle, the current can be measured at the falling (or rising) edge of the clock cycle, so that a current measurement is triggered at each half clock cycle after a data bit is transmitted.

Figure 5A:
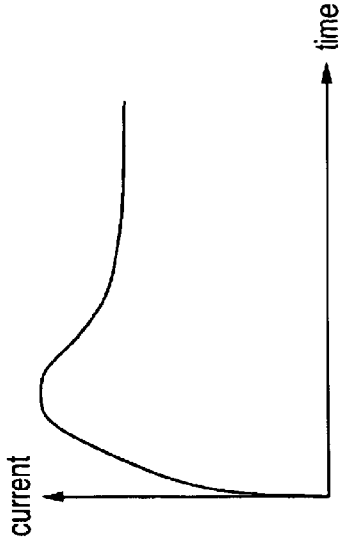
FIGS. 5A and 5B are graphs of current and voltage curves with a data collision.
Figure 5B:
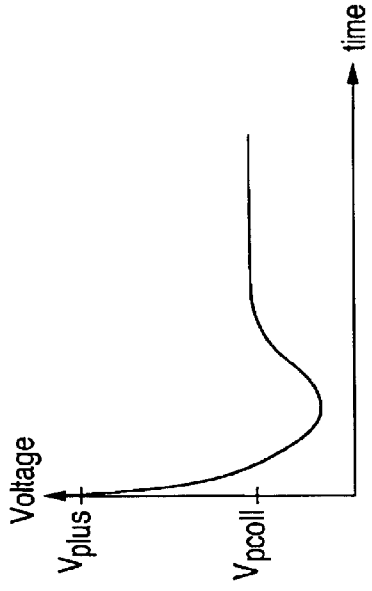

However, when a collision has occurred, i.e., device 100 is writing a '0' onto wire 10 while driver 250 in device 200 is writing a '1' onto wire 10, wire 10 is being pulled down by the signal transmitted by device 100. In this case, wire 10 cannot be fully charged to $V_{plus}$, which in turn, prevents the current drawn from $V_{plus}$ through resistor R1 from falling back down to zero, as shown in FIG. 5A. As a result, the voltage at $P_{sense}$ only increases to a value, $V_{pcoll}$, less than $V_{plus}$ and never recovers back to $V_{plus}$, as shown in FIG. 5B. Consequently, a large current flowing in PMOS transistor 340 indicates when a collision is present, and a small or non-existent current flowing in PMOS transistor 340 indicates when no collision is present. Thus, if a current change is detected that exceeds the expected current change when no collision is present (possibly with some cushion), a collision is detected.

Similarly, when $D_{in}$ is set to '1'for writing a logic '0' onto wire 10, PMOS transistor 340 is turned off and NMOS transistor 360 is turned on. Without a collision, the current in NMOS transistor 360 increases to a maximum value as wire 10 is discharged and then falls back down to zero (or a small value if a pull up resistor is on the wire). Correspondingly, the voltage at $N_{sense}$ levels off at $V_{minus}$ (or a slightly higher value if a pull up resistor is on the wire) after wire 10 has been written with a logic '0', i.e., pulled down. However, with a collision, i.e., device 100 writing a '1' while driver 250 is writing a '0', the current in NMOS transistor 360 levels off at a high value and does not fall back down to a zero or low value, and the voltage at $N_{sense}$ only falls back to a value $V_{ncoll}$, which is much higher than $V_{minus}$. Thus, by sensing excess current, rather than a precise current value, on wire 10, precise detection thresholds do not need to be set, which simplifies the collision detection circuit. Furthermore, with more than two devices or nodes coupled to wire 10, a collision or collisions are detected when an excess of current is sensed on the wire, thereby obviating the need to set separate thresholds for detecting multiple collisions.

One method of sensing the current change to distinguish high and low current values flowing in transistors 340 and 360 and thereby detect the presence or absence of a collision, respectively, is to use the values of $P_{sense}$ and $N_{sense}$. When PMOS transistor 340 is on (driver 250 writing a '1'), the voltage at $P_{sense}$ rises to a high value around $V_{plus}$(FIG. 4B) in the absence of a collision, and the voltage at $P_{sense}$ only rises to a low value (FIG. 5B) in the presence of a collision. In both cases, $N_{sense}$ stays at $V_{minus}$ because NMOS transistor 360 is off. On the other hand, when NMOS transistor 360 is on (driver 250 is writing a '0'), the voltage at $N_{sense}$ drops to a low value at or around $V_{minus}$ in the absence of a collision, and the voltage at $N_{sense}$ levels off at a high value in the presence of a collision. In both cases, $P_{sense}$ stays high at $V_{plus}$ because PMOS transistor 340 is off.

FIG. 6 shows one embodiment of collision detection circuit 260 of FIG. 2, which uses the values of $P_{sense}$ and $N_{sense}$ to detect the current on wire 10. Circuit 260 includes PMOS transistors MP1–MP8 and NMOS transistors MN1–MN4. For detecting current when NMOS transistor 360 is on, i.e., the voltage across resistor R2, PMOS transistors MP3–MP6 form a biasing circuit, and NMOS transistors MN1 and MN2 form a sense circuit, with NMOS transistor MN2 being larger than NMOS transistor MN1. $N_{sense}$ is coupled to the source of transistor MN2, and $V_{minus}$ is coupled to the source of transistor MN1. For detecting current when PMOS transistor 340 is on, i.e., the voltage across resistor R1, NMOS transistors MN3 and MN4 form a biasing circuit, and PMOS transistors MP7 and MP8 form a sensing circuit, with PMOS transistor MP8 being larger than PMOS transistor MP7. $P_{sense}$ is coupled to the source of transistor MP8, and $V_{plus}$ is coupled to the source of transistor MP7.

When NMOS transistor 360 is on, $P_{sense}$ is high (around $V_{plus}$) since PMOS transistor 340 is off and no current flows across resistor R1, resulting in the sources of transistors MP7 and MP8 both being at $V_{plus}$. Furthermore, since transistors MP7 and MP8 are on, $P_{out}$, measured between the drains of transistors MP8 and MN4, is high, at $V_{plus}$. With no collision and no pull up resistor on wire 10, no current flows in NMOS transistor 360 after an initial discharge period, and thus, no current flows across resistor R2. As a result, $N_{sense}$ is low (at $V_{minus}$) and because $V_{minus}$ is connected to the source of transistor MN1 and $N_{sense}$ is connected to the source of transistor MN2, the sources of transistors MN1 and MN2 of the sensing circuit are both at $V_{minus}$. With transistors MN1 and MN2 on, $N_{out}$, measured between the drains of transistors MP6 and MN2, is low, at $V_{minus}$.

However, when a pull up resistor is present on wire 10, a small current flows in NMOS transistor 360 due to a pull up on the wire. As a result, a small current flows through resistor R2, and $N_{sense}$ levels off at a small value, slightly higher than $V_{minus}$, as discussed above. Thus, the voltage at the source of transistor MN2 is slightly higher than the voltage at the source of transistor MN1. Because biasing circuit transistors MP3 and MP4 are the same size and MP5 and MP6 are the same size, but sense transistor MN2 is larger than transistor MN1, the voltage at $N_{out}$ is kept low even with the slightly higher voltage at the source of MN2. Thus, referring back to FIG. 2, with $P_{out}$ high and $N_{out}$ low, the signal $S_{coll}$ will be low, indicating no collision and causing driver circuit 250 to remain active and continue transmitting data onto wire 10.

Figure 7:
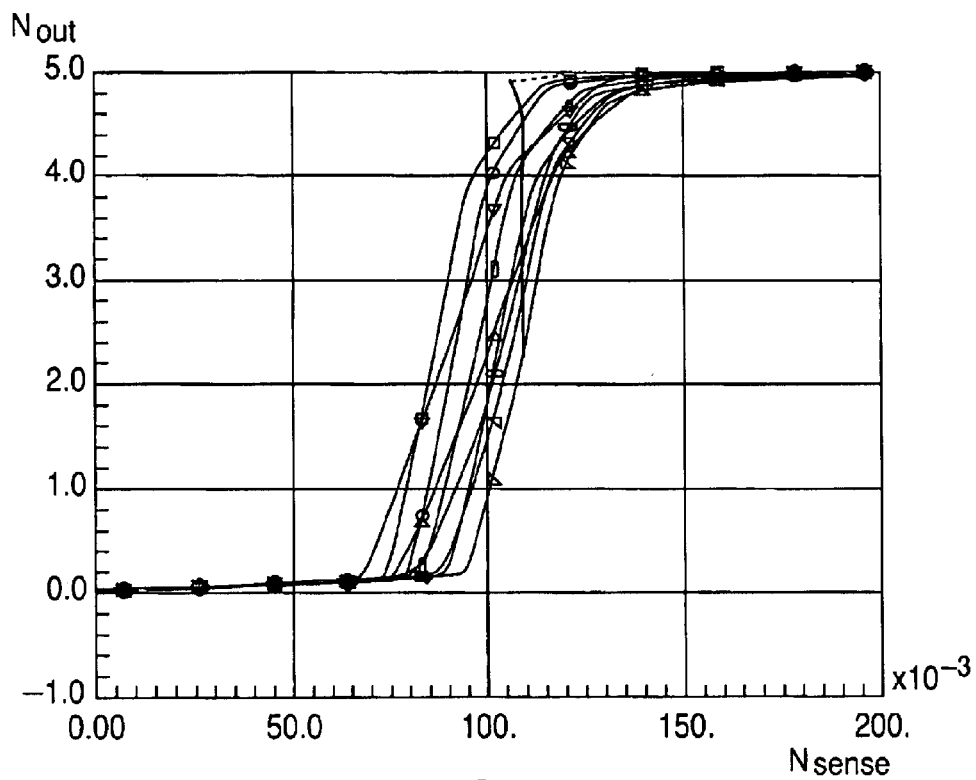
FIG. 7 is a graph of $N_{out}$ as a function of $N_{sense}$ for the circuit of FIG. 6.

When a collision occurs on wire 10 (in the case when NMOS transistor 360 is on), a large current flows in NMOS transistor 360, as discussed above, and across resistor R2, resulting in a high voltage at $N_{sense}$. The large difference between the voltage at the source of transistor MN2 ($N_{sense}$) and MN1 ($V_{minus}$) overcomes the size difference between the two transistors MN1 and MN2, resulting in $N_{out}$ being high. Thus, by sensing a large voltage difference, a collision is detected. FIG. 7 shows a plot of $N_{out}$ as a function of $N_{sense}$. As seen from FIG. 7, $N_{out}$ quickly goes from a low value to a high value as $N_{sense}$ increases from approximately 60 mV to approximately 125 mV. The curves represent the case where transistor MN2 is about twice as large as transistor MN1 and the resistance of resistor R2 is 20 Ω. By changing the sizes of transistors MN1 and MN2 and/or the resistance of resistor R2, the range where $N_{out}$ switches from low to high, indicating a sufficient change in current through NMOS transistor 360 for detecting a collision, can be moved or adjusted as desired.

Similarly, when PMOS transistor 340 is on, $N_{sense}$ is low (at $V_{minus}$) since NMOS transistor 360 is off and no current flows across resistor R2, resulting in the sources of transistors MN1 and MN2 both being at $V_{minus}$. Furthermore, since transistors MN1 and MN2 are on, $N_{out}$ is low, at $V_{minus}$. With no collision, little (pull down resistor present on the wire) or no (no pull down resistor) current flows in PMOS transistor 340 after an initial discharge period, and thus, little or no current flows across resistor R1. As a result, $P_{sense}$ is high (around $V_{plus}$) so that the sources of transistors MP7 and MP8 are both around $V_{plus}$. With the size difference between transistors MP7 and MP8, $P_{out}$ remains high (around $V_{plus}$) even when the voltage at the source of transistor MP8 is slightly lower than at the source of transistor MP7. With $P_{out}$ high and $N_{out}$ low, the signal $S_{coll}$ will be low, indicating no collision and causing driver circuit 250 to remain active and continue transmitting data onto wire 10.

Figure 8:
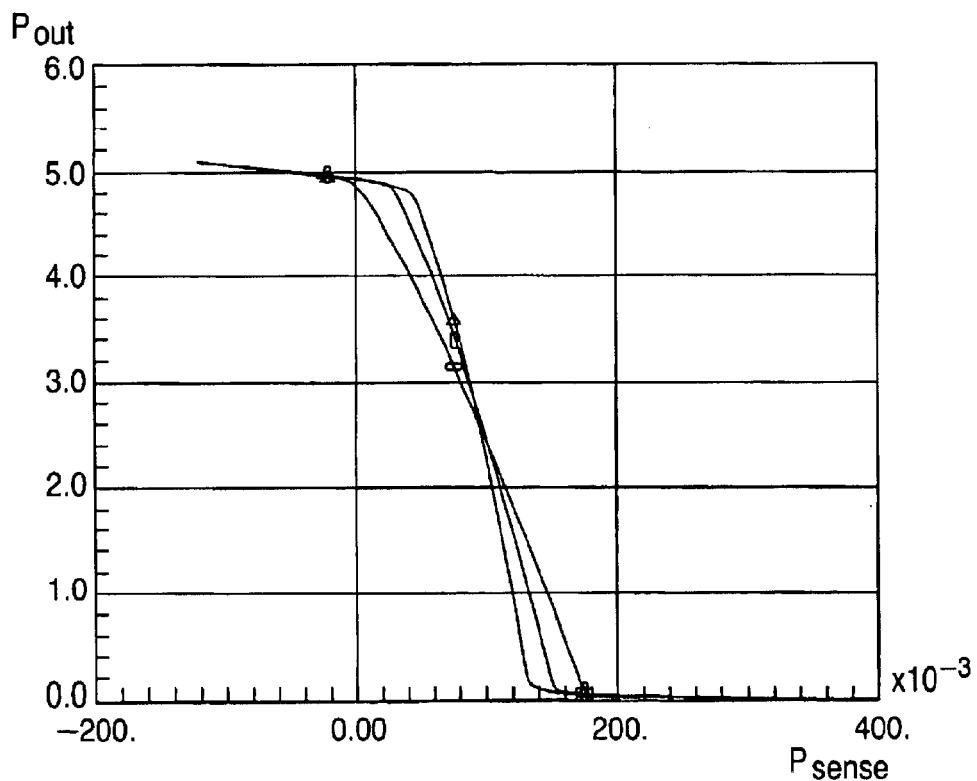
FIG. 8 is a graph of $P_{out}$ as a function of $P_{sense}$ for the circuit of FIG. 6.

When a collision occurs while PMOS transistor 340 is on, a large current flows in PMOS transistor 340 and across resistor R1, resulting in a low voltage at $P_{sense}$. The large difference between the voltage at the sources of transistor MP8 ($P_{sense}$) and MP7 ($V_{plus}$) again overcomes the size difference between the two transistors MP7 and MP8, resulting in $P_{out}$ being low. FIG. 8 shows $P_{out}$ quickly going down from a high value to a low value within a short range of voltages for $P_{sense}$. Again, by changing the sizes of transistors MP7 and MP8 and/or the resistance of resistor R1, the voltage range where $P_{out}$ switches from high to low, indicating a sufficient change in current through PMOS transistor 340 for detecting a collision, can be moved or adjusted.

Thus, when $N_{out}$ goes high ($P_{out}$ stays high) or when $P_{out}$ goes low ($N_{out}$ stays low), $S_{coll}$ goes high and driver circuit 250 is disabled. Once disabled, device 200 reads the data in the special packet transmitted by device 100 onto wire 10. Upon detecting two consecutive '1's, device 200 knows that transmission of the special packet sent by device 100 has ended and that the next packet of bits contains information or data which is intended for device 200, thereby synchronizing the two devices 100 and 200.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

We claim:

1. A data communications system comprising:

a first communication node;

a second communication node;

a bidirectional wire connecting said first and second communication nodes for transmitting data between said first and second communication nodes; and a collision detection circuit coupled to said first communication node, wherein said collision detection circuit senses a current change on said wire to indicate whether a collision has occurred.

2. The system of claim 1, wherein a collision is detected when said current change exceeds the value of the current on said wire when no collision has occurred.

3. The system of claim 2, wherein said collision detection circuit detects a collision when said current change exceeds the value of the current on said wire when no collision has occurred after a time period for said wire to settle.

4. The system of claim 1, wherein said collision detection circuit comprises a resistor coupled to said wire, said changes in current sensed by sensing voltage changes across said resistor.

5. The system of claim 1, wherein said change in current occurs when said first and second communication nodes are transmitting different bits on said wire at the same time.

6. The system of claim 1, wherein said first communication node transmits a control packet to force a collision on said wire with a data packet transmitted by said second communication node.

7. The system, of claim 6, wherein said data packet comprises at least three consecutive bits of the same type.

8. The system of claim 7, wherein said control packet comprises a sequence of bits, said bit sequence alternating between two bit types.

9. The system of claim 7, wherein said control packet ends with two consecutive bits of the same type.

10. The system of claim 4, wherein a positive voltage change indicates a first type of collision and a negative voltage change indicates a second type of collision.

11. A method of data communications, comprising:

transmitting a data packet along a single bi-directional wire from a first node;

transmitting a control packet along said wire from a second node when said second node wishes to obtain control of said wire;

detecting a current change on said wire to indicate a collision between bits in said data and control packets; and halting transmission of said data packet by said first node.

12. The method of claim 11, wherein a collision is detected when said current change exceeds the value of the current on said wire when no collision has occurred.

13. The method of claim 11, wherein said collision is detected when said current change exceeds the value of the current on said wire when no collision has occurred after a period of time for said wire to settle.

14. The method of claim 11, wherein said detecting comprises sensing a voltage change across a resistor coupled to said wire.

15. The method of claim 11, wherein said transmitting a control packet comprises transmitting a sequence of bits in said control packet to force a collision with said data packet.

16. The method of claim 15, wherein said data packet comprises of at least three consecutive bits of the same type.

17. The method of claim 15, wherein said control packet comprises a sequence of bits, said sequence of bits alternating between two bit types.

18. The method of claim 17, wherein said control packet ends with two consecutive bits of the same type.

19. The system of claim 18, wherein a positive voltage change indicates a first type of collision and a negative voltage change indicates a second type of collision.

* * * * *